(12) United States Patent
Prust et al.

(10) Patent No.: US 7,255,667 B2
(45) Date of Patent: Aug. 14, 2007

(54) CARRIER FOR TOOL HOLDERS

(75) Inventors: Dirk Prust, Tuttlingen (DE); Hans-Henning Winkler, Tuttlingen (DE)

(73) Assignee: Chiron-Werke GmbH & Co. KG, Tuttlingen (DE)

(*) Notice: Subject to any disclaimer, the term of this patent is extended or adjusted under 35 U.S.C. 154(b) by 0 days.

(21) Appl. No.: 11/151,682

(22) Filed: Jun. 13, 2005

(65) Prior Publication Data

US 2005/0277530 A1   Dec. 15, 2005

(30) Foreign Application Priority Data

Jun. 14, 2004   (DE) ...................... 10 2004 029 045

(51) Int. Cl.
*B23Q 3/157* (2006.01)

(52) U.S. Cl. ..................... 483/59; 483/68; 483/902; 294/104; 294/113

(58) Field of Classification Search ............... 483/902, 483/901, 900, 59, 65, 68, 66; 294/113, 104
See application file for complete search history.

(56) References Cited

U.S. PATENT DOCUMENTS

| 4,761,877 | A |   | 8/1988  | Rupp |
|-----------|---|---|---------|------|
| 4,879,802 | A |   | 11/1989 | Winkler |
| 5,018,265 | A | * | 5/1991  | Winkler et al. ............... 483/59 |
| 5,188,579 | A |   | 2/1993  | Rüschle et al. |
| 5,328,224 | A |   | 7/1994  | Jacobsen et al. |
| 5,772,566 | A |   | 6/1998  | Schweizer et al. |
| 6,783,484 | B2 |  | 8/2004  | Müller |
| 2002/0028735 | A1 | | 3/2002 | Hans-Dieter |

FOREIGN PATENT DOCUMENTS

| DE | 35 31 160 A1  | 3/1987 |
| DE | 37 17 201 A1  | 12/1988 |
| DE | 40 36 915 A1  | 5/1992 |
| DE | 195 37 071 A1 | 3/1997 |
| DE | 199 19 446 A1 | 11/2000 |
| DE | 100 39 525 A1 | 2/2002 |
| EP | 1 179 387 A1  | 2/2002 |

* cited by examiner

*Primary Examiner*—Erica Cadugan
(74) *Attorney, Agent, or Firm*—Harness, Dickey & Pierce, P.L.C.

(57) ABSTRACT

A carrier for tool holders of a machine tool has at least one movable jaw which can be pivoted about a pivot axis that runs transversely with respect to a longitudinal axis of said tool holders. Said movable jaw can be pivoted between an expanded position and a closed position in which it grasps in a form-fitting manner a tool holder which is inserted into said carrier.

11 Claims, 6 Drawing Sheets

CARRIER FOR TOOL HOLDERS

FIELD OF THE INVENTION

The present invention relates to a carrier for tool holders of a machine tool, said tool holders having a longitudinal axis, and said carrier having at least one movable jaw which can be pivoted about a pivot axis between its expanded position and its closed position, in which closed position it grasps in a form-fitting manner a tool holder which is inserted into the carrier.

BACKGROUND OF THE INVENTION

Carriers of this type are known to a sufficient extent from the prior art. They may be formed either as a gripper hand on a tool changer or as a storage space in a tool magazine. They serve to move a tool holder, which as a rule is a standardized steep-taper tool holder or a hollow shank taper tool holder and on its lower shank bears a machining tool, rapidly towards a working spindle or away from it.

At their upper end, the standardized tool holders have a conical section with which they are inserted into a corresponding tool-holding fixture on the end side of a working spindle. The conical upper section is adjoined by a thickened, cylindrical collar which is provided with an encircling gripper groove at which the tool holders are grasped by the carriers. The shank in which the machining tool is held adjoins the bottom of the cylindrical collar.

As already mentioned, the carrier may be formed as a gripper hand on a tool changer, which removes tool holders from a tool magazine and inserts them into the tool-holding fixture on the working spindle, or removes tool holders from the tool-holding fixture and deposits them again into the tool magazine.

Machine tools are known, in which a tool changer is provided with a gripper hand, so that first of all a tool holder is removed together with a machining tool which was previously in use from the tool-holding fixture and is deposited into an empty space in the tool magazine before a new tool holder is removed from the tool magazine and is inserted into the tool-holding fixture. In the case of other known machine tools, two tool changers are provided which operate in a push-pull action, with the result that the one gripper hand is already moving a tool holder, which has been removed from the tool magazine, towards the working spindle while the other gripper hand is removing the tool holder which has previously been clamped in place on the tool-holding fixture, and is transporting it to the tool magazine.

In addition, machine tools are known, in which the changing of tools takes place by the pick-up method, in which the working spindle directly approaches a changing position on the tool magazine and there first of all deposits the clamped-in tool holder into an empty space, whereupon the tool magazine moves a new tool holder to the changing position where it is "picked up" by the working spindle.

Gripper hands described in this respect and the storage spaces in the tool magazine are formed in each case by the carriers which are mentioned at the beginning and in which the tool holders are retained in a form-fitting manner by means of the at least one movable jaw.

This form-fitting retention of the tool holders in the carriers is important not only for the operating reliability of the known machine tools, but also for the speed at which a changing of tools can take place. This is because the more rapidly the storage spaces in a tool magazine can be moved and/or the more rapidly a gripper hand can be moved between the tool magazine and the tool-holding fixture on the working spindle, the more rapidly can a machining tool which is in use be interchanged for a new machining tool.

Due to the high accelerations which occur during the moving of the tool magazine and/or the moving of the gripper hand, it is imperative for the tool holders to be securely grasped in the carriers. A tool holder which falls out of a carrier leads not only to a stoppage in the machining process, but may also cause considerable damage to the machine tool and, in the most unfavourable situation, may even cause injury to people.

However, the abovementioned damage is caused not only by the tool holders falling out; also, a tool holder which is only partially released from the carrier generally results in the machining operation having to be broken off because the tool holder is now no longer inserted in the correct position into the working spindle or placed into the magazine.

For this purpose, most known carriers have two movable jaws which are prestressed into their closed position by tension or compression springs. In this case, the spring force determines the force with which the tool holders are retained in the carrier, since the form-fitting connection is not self-locking and, upon corresponding accelerations, the tool holder presses the movable jaws in the direction of their expanded position, which is only prevented by the force of the tension or compression springs. If the springs break off or alter, this results in the tool holders no longer being securely retained in the known carriers.

DE 37 17 201 A1 discloses a carrier in the form of a gripper hand having two fixed jaws which grasp a tool holder at its gripper groove and retain it in the axial direction. Two movable jaws are arranged pivotably on the two fixed jaws and are opened and closed via a positively controlled mechanism about axes parallel to the longitudinal axis of the tool holder. The mechanism is driven via the axial movement of an actuating member and is prestressed into its closed position by means of a compression spring. In the expanded position of the movable jaws, the tool holder can be pulled laterally out of the fixed jaws transversely with respect to its longitudinal direction.

In the case of this carrier, it is also disadvantageous that, when the clamping force of the spring slackens, the closing force and therefore the retaining force diminish, or are completely lost if the spring breaks. As far as the closing of the movable jaws is concerned, the known carrier is dependent on the reliability of the compression spring.

In addition, the spring force is often also not sufficient in order to close the movable jaws. This occurs in particular if the mechanism is jammed by chips which have passed into the gripper hand. In these situations, when the gripper hand is moved, the tool may fall out of the gripper hand and cause the abovementioned damage to the machine tool.

A carrier disclosed in DE 40 36 915 A1 avoids these disadvantages in the case of a carrier as disclosed in DE 37 17 201 A1 by the fact that the mechanism is not actuated via a compression spring but rather via a coupling mechanism which temporarily connects the gripper hand to a spatially fixed stop. Movement of the coupled-up gripper hand in relation to the spatially fixed stop causes the mechanism to be actuated, as a result of which the movable jaws are pivoted between their expanded position and their closed position.

Although this carrier avoids the disadvantages which are associated with jaws prestressed via springs, it is nevertheless a very complicated design in terms of structure, the changing of tools taking place very slowly because of the coupling-up and the measures associated therewith.

However, DE 195 37 071 A1 also describes a carrier in the form of a gripper hand which is arranged on a tool changer and transfers tool holders between a tool-holding fixture on a working spindle, and a tool magazine. This carrier has two movable jaws which can be pivoted about a pivot axis, running parallel to the longitudinal axis of the tool holders, between an expanded position and a closed position. Instead of the above-described two fixed jaws, a clamping block is provided which, after a complicated tool-changing process, fixes the tool holder in the axial direction if it is already inserted by its taper into a tool-holding fixture. The two movable jaws are pivoted via a pneumatic, hydraulic or electromechanical drive.

In the case of this carrier, it is disadvantageous that, firstly, it is very complicated in terms of structure and, secondly, has a high weight, so that it makes only a slow changing of tools possible because of the heavy mass which is to be moved. Furthermore, due to the interaction of clamping block and tool-holding fixture, the moving is relatively complicated plicated and has to be checked via sensors, so that the changing of tools can also take place slowly because of this.

DE 199 19 446 A1 describes a carrier which is designed as a magazine space in a tool magazine. In the case of this known carrier, the tool holder is introduced transversely between two fixed jaws and is then lowered into a depression provided on the jaws where it is retained by means of its dead weight. The changing of tools takes place here by the pick-up method, the working spindle entering a tool holder which is to be interchanged laterally and transversely into the carrier which, in the process, engages with its fixed jaws into the gripper groove of the tool holder on opposite sides. When the tool holder is completely pushed in transversely, it is lowered, so that it comes to lie in the depression.

Although this construction is very simple, it does not permit rapid movement of the carrier, since the tool holder is only retained by means of its dead weight.

Document EP 1 179 387 A discloses a carrier having two fixed jaws defining an opening into which a tool holder is inserted laterally. Further provided is a C-shaped claw that is pivoted from above around a pivot axis running transversely with respect to a direction along which said tool holder is inserted into said carrier. Said tool holder has a diameter becoming larger in the direction of the carrier, so that said claw grasps around said larger diameter of said tool holder. For opening said carrier, said claw is pivoted to the above in active manner using a working piston. Said pivoting down onto said carrier is supported by a tension spring.

Further to the complicated design it is a disadvantage of the known carrier that said claw can be pressed against the tension force in its open position since the tool holder is tapering in a direction away from the carrier.

SUMMARY OF THE INVENTION

In view of the above, the present invention is based on the object of developing the carrier mentioned at the outset in such a manner that, with a simple design in terms of structure, the operating reliability is improved and a rapid changing of tools is made possible.

According to one object of the invention, said pivot axis is arranged transversely with respect to said longitudinal axis and in said expanded position of said at least one movable jaw said tip has been pivoted towards said carrier.

According to a further object of the present invention, said pivot axis runs obliquely with respect to a direction along which said tool holder is being inserted into said carrier.

According to an even further object of the present invention, said at least one movable jaw protrudes in the longitudinal direction above an outer contour of said tool holder in case said tool holder is inserted into said carrier.

The object underlying the invention is thereby completely achieved.

This is because the inventors of the present application have recognized that it is not necessary to form the pivot axis of the movable jaw parallel to the longitudinal axis of the tool holder, but rather that the pivot axis may also run transversely with respect thereto. This means, however, that the movable jaw no longer moves in the plane of the form-fitting connection, as is provided for in the prior art, but rather that the movable jaw is pivoted out of the plane for opening purposes and is pivoted back into the plane for closing purposes.

Because said movable jaw is pivoted from below into the form-fit, said form-fit is very reliable. If said tool holder is being pulled laterally out of said closed carrier, there occurs no force component that could move said movable jaw into said expanded position.

The retaining force now does not depend on a spring force or an optionally self-locking mechanism, but rather only on the form-fitting connection which has taken place. The retaining force can also no longer be "overpressed", since, when the carrier moves rapidly, the centrifugal force means that the tool holder does not press the movable jaw about its pivot axis, but rather loads it transversely with respect to the pivot axis, towards which, however, the movable jaw cannot yield.

The novel carrier can therefore be moved very rapidly, with it having a very simple construction. The actuation of the movable jaw can take place in any desired manner.

In one embodiment it is preferred if, in the closed position, the at least one movable jaw rests with its tip on an outer face of the tool holder, which face runs essentially in the direction of the longitudinal axis.

It is advantageous here that the movable jaw grasps the tool holder in a self-locking manner. Since the outer face of the tool holder on which the movable jaw rests runs essentially vertically, the movable jaw is not pressed downwards about its longitudinal axis when the tool holder is accelerated transversely with respect to its outer face. If the outer face were inclined inwards, then the tool holder, upon an acceleration out of the carrier, would not only exert a force on the movable jaw in the plane of the form-fitting connection, but also a force component in the direction of its longitudinal axis, as a result of which the said movable jaw would then transfer into its expanded position if the frictional force with which the tip of the movable jaw adheres on the outer face of the tool holder were overcome.

This measure therefore ensures that the carrier retains the tool holder with a very high force, so that the carrier can be accelerated and braked very severely without the tool holder being hauled out of the carrier. This consequently enables a very reliable and rapid changing of tools. However, this measure is also of advantage in terms of structure, since it can use an outer face which is used in any case, for example, on the thickened collar of the tool holder, for the form-fitting connection.

Because the pivot axis runs obliquely with respect to a direction along which said tool holder is inserted into said carrier, the tip of the movable jaw, when pivoted out of the plane of the form-fitting connection, is simultaneously removed from the tool holder or the outer contour thereof, and, as a result, automatically releases it; this is because, in this arrangement, the pivot axis also runs obliquely with respect to the outer contour of the tool holder with this measure, the novel carrier can therefore be designed very simply in terms of structure and a snap-on mechanism or the like does not additonally have to be provided on the tip of the movable jaw, as may optionally be required in the case of a pivot axis arranged transversely with respect to said direction of inserting said tool holder.

Furthermore, it is preferred if the at least one movable jaw is prestressed in a spring-loaded manner into its closed position.

In the case of this measure, it is advantageous that the movable jaw can be actuated in a very simple manner; this is because it has only to be pressed down in order to be transferred from its closed position into its expanded position. This may take place by bringing up to a spatially fixed stop, or by means of an external-force actuated tappet which is provided in the transfer position to the tool magazine or on the working spindle. Also in terms of structure the novel carrier is of very simple design, with the spring force not determining the retaining force, but only the closing force, i.e. the force with which the movable jaw is transferred from the expanded position to the closed position. When the spring has brought the movable jaw into the closed position, it only has to use the, if appropriate, very small force component which an accelerated tool holder exerts in the direction of its longitudinal axis on the movable jaw. However, by means of an appropriate configuration of the outer contour on which the tip rests, this force component may be very small or may not occur at all.

Because said at least one movable jaw protrudes above said outer contour of said tool holder, a very simple opening of the carrier is possible, because the working spindle itself opens the jaw when it moves on to the tool holder from above in order to pass with its end side into contact with an end face of the tool holder. This measure is to be used here both for changing tools by the pick-up method and also for changing tools with the aid of gripper hands. If the carrier is provided on a gripper hand, then a corresponding bearing face on the working spindle is also provided in the tool magazine, with the result that, when the gripper hand is moved into the tool magazine, the movable jaw is automatically transferred into its expanded position.

In general, it is also preferred if the carrier has two fixed jaws which define an opening and by which a tool holder which is inserted laterally into the carrier through the opening is retained in a form-fitting manner in the longitudinal direction.

This measure is known per se and affords the advantage that the tool holder, after the transfer of the at least one movable jaw into the expanded position, cannot fall out as long as the carrier is not then moved or is not rapidly moved.

Furthermore, it is preferred if the at least one movable jaw has a face which points upwards in the longitudinal direction and runs in an inclined manner downwards towards the carrier.

It is advantageous here that, when a tool holder which is retained by the working spindle is inserted into the carrier, the working spindle, which moves laterally towards the carrier, in the process gradually presses the movable jaw downwards, with the result that the latter pivots into its expanded position. In other words, the lateral moving of the tool holder into the carrier, as takes place, for example, when changing tools by the pick-up operation, means that the at least one movable jaw is gradually pressed downwards, so that the movable jaw passes into the expanded position and the tool holder can be pushed completely into the carrier. When the working spindle then ejects the tool holder and moves upwards away from the carrier, it again releases the movable jaw which then pivots into its closed position by means of the force of the compression or tension spring.

In view of the above, the present invention also relates to a method for changing tool holders in carriers of a machine tool, each carrier being provided with at least one movable jaw which can be pivoted between its expanded position and its closed position in which it grasps in a form-fitting manner a tool holder which is inserted into the carrier, the working spindle pressing on its end side onto the at least one movable jaw and pivoting the latter into its expanded position.

This measure summarizes the advantages mentioned above; the relative movement between working spindle and carrier automatically transfers the movable jaw into its expanded position, so that a tool holder can be placed by the working spindle into the carrier or can be removed from the carrier.

In this case, the carrier can be used either as a storage space in a tool magazine, so that the changing of tools takes place by the pick-up operation, or may be formed on a gripper hand of a tool changer, the gripper hand then being moved under the working spindle with the aid of the tool-changing apparatus.

Further advantages become apparent from the description and the attached drawing.

It goes without saying that the features mentioned above and those which have yet to be explained below can be used not only in the respectively stated combinations but also in other combinations or on their own without departing from the scope of the present invention.

BRIEF DESCRIPTION OF THE DRAWINGS

An embodiment of the invention is illustrated in the drawing and is explained in more detail in the description below. In the drawing.

DETAILED DESCRIPTION OF A PREFERRED EMBODIMENT

Figure 1:
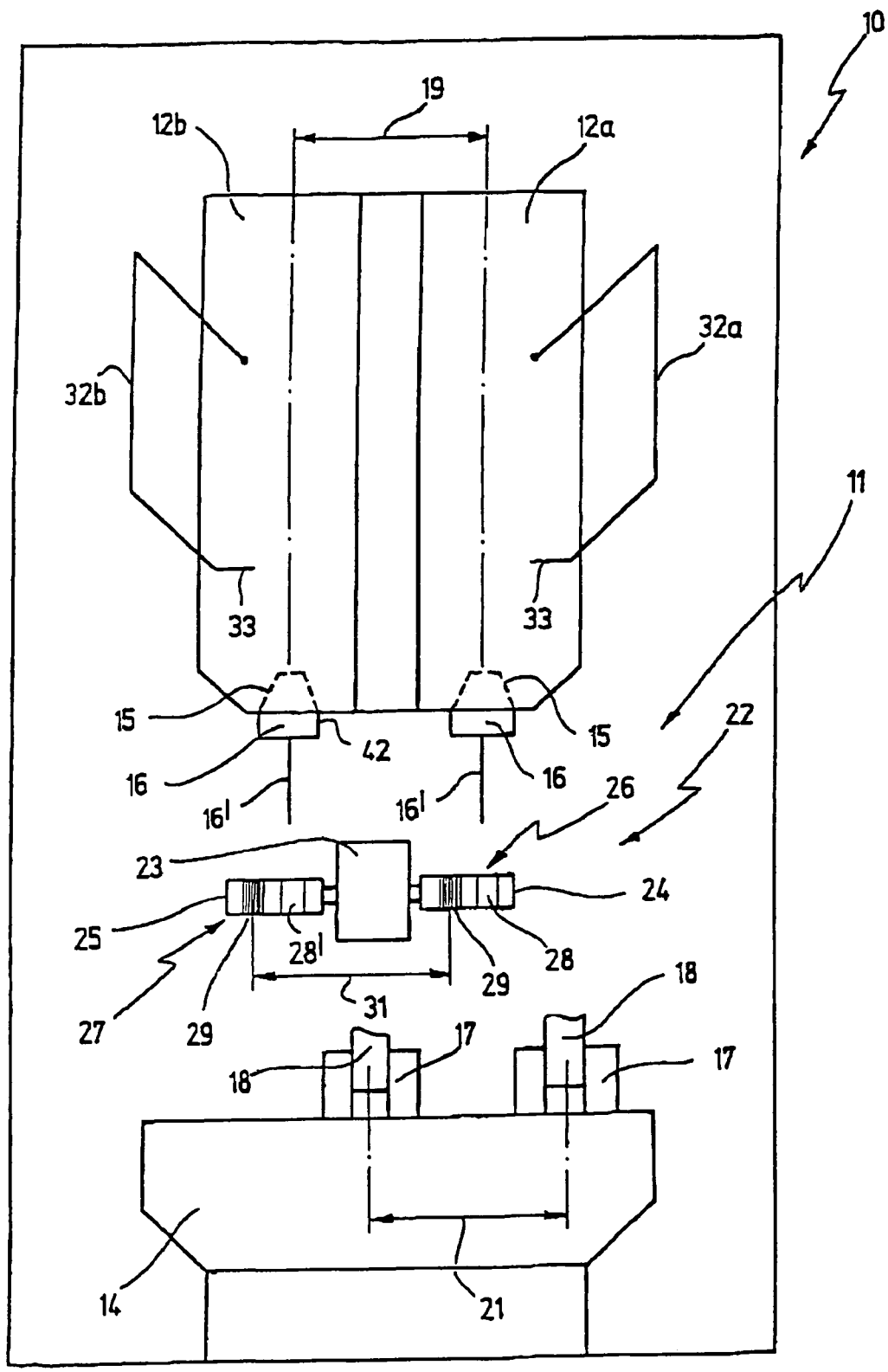
FIG. 1 shows, in a schematic front view, a machine tool in which the novel carriers are used.

In FIG. 1, 10 illustrates, schematically in front view, a machine tool which has a working space 11 in which two working spindles 12a and 12b can be moved relative to a workpiece table 14.

Each working spindle 12a, 12b has a customary tool-holding fixture 15 into which is clamped in each case a tool holder 16 which bears a machining tool 16' (indicated schematically).

With the aid of the tools 16', workpieces 18 which are clamped into two apparatuses 17 on the workpiece table 14 are machined.

The working spindles 12a and 12b are at a distance from each other which is indicated at 19 and corresponds to a distance (indicated at 21) between the apparatuses 17 and therefore the workpieces 18. In this manner, it is possible to machine the workpieces 18 synchronously with the working spindles 12a and 12b.

In the working space 11, a magazine for tools 16' is indicated at 22, which magazine is usually arranged behind the working spindles 12a and 12b and is moved into the working space 11 only for changing tools.

The magazine 22 comprises a chain housing (indicated at 23) over which laterally a first carrier 24 protrudes to the right and a second carrier 25 protrudes to the left. The carrier 24 is in a first transfer position 26 and the carrier 25 is in a second transfer position 27. The carrier 24 is provided for changing tools on the working spindle 12a and the carrier 25 is provided for changing tools on the working spindle 12b.

The two tool carriers 24, 25 have an empty storage space 28 and 28' into which the tool 16', which is clamped in the working spindles 12a, 12b can be placed together with its particular tool holder 16. Furthermore, a further storage space 29, 29' is provided in both carriers 24, 25, which space is equipped with a tool holder and a tool which is clamped therein and is the next to be inserted into the working spindle 12a, 12b.

The storage spaces 28 and 28' and the storage spaces 29 and 29' are at a distance from each other that is indicated at 31 and corresponds to the distance 19 between the working spindles 12a and 12b.

It is thereby possible initially to place the tools 16' in their tool holders 16 synchronously in the storage spaces 28, 28' and then to remove tool holders 16 from the storage spaces 29, 29'. Such a changing of tools is also referred to as the pick-up operation.

As an alternative, it is also possible, in the case of the machine tool 10 from FIG. 1, to transfer the tool holders 16 between the tool magazine 22 and the particular tool-holding fixture 15 with the aid of tool-changing apparatuses 32a, 32b. For this purpose, the tool-changing apparatuses 32a, 32b (indicated merely schematically in FIG. 1), which bear a respective carrier 33 for tool holders 16 at their lower, free end, are pivoted from the rest position (shown in FIG. 1) into a working position in which the carriers 33 are situated either on the tool magazine 22 or below the particular tool-holding fixture 15. The carriers 33 remove a tool holder 16 either from the tool magazine 22 or the tool-holding fixture 15 and then transport this tool holder to the tool-holding fixture 15 or the tool magazine 22. It is also known to assign two tool-changing apparatuses 32a, 32b to each working spindle 12a, 12b, so that the tool holder 16 can be changed in a push-pull operation.

In this case, the carriers 33 and the carriers 24 and 25 are of comparable design. They use a movable jaw to grasp a picked-up tool holder 16 in a form-fitting manner, so that it cannot be hurled out of the particular carrier 24, 25, 33 upon rapid moving either of the tool-changing apparatus 32a, 32b or of the tool magazine 22.

If the novel carrier is designed as a carrier 33 or else as a gripper hand on the tool changers 32a, 32b, the corresponding magazine spaces 28, 29 in the tool magazine 22 are not, of course, formed by comparable carriers but rather by internal cone holders which are formed analogously to the tool-holding fixture 15. If the carrier 33 is now moved from below under the tool-holding fixture 15 or a corresponding storage space in the tool magazine 22, it automatically releases, in a manner yet to be described, the tool holder, which is up to then retained in a form-fitting manner, so that it can be clamped into the working spindle 12a, 12b or can be placed in the machine-tool magazine 22. The carrier 33 can then be moved away without further measures.

If, by contrast, the machine tool 10 operates by the pick-up tool-changing operation, the tool-changing apparatuses 32a, 32b are not provided and the carriers 24, 25 are then, on the contrary, designed in such a manner that they retain the tool holders 16 in a form-fitting manner and release the form-fitting connection when the working spindles 12a, 12b are brought from above onto the carriers 24, 25.

Figure 2:
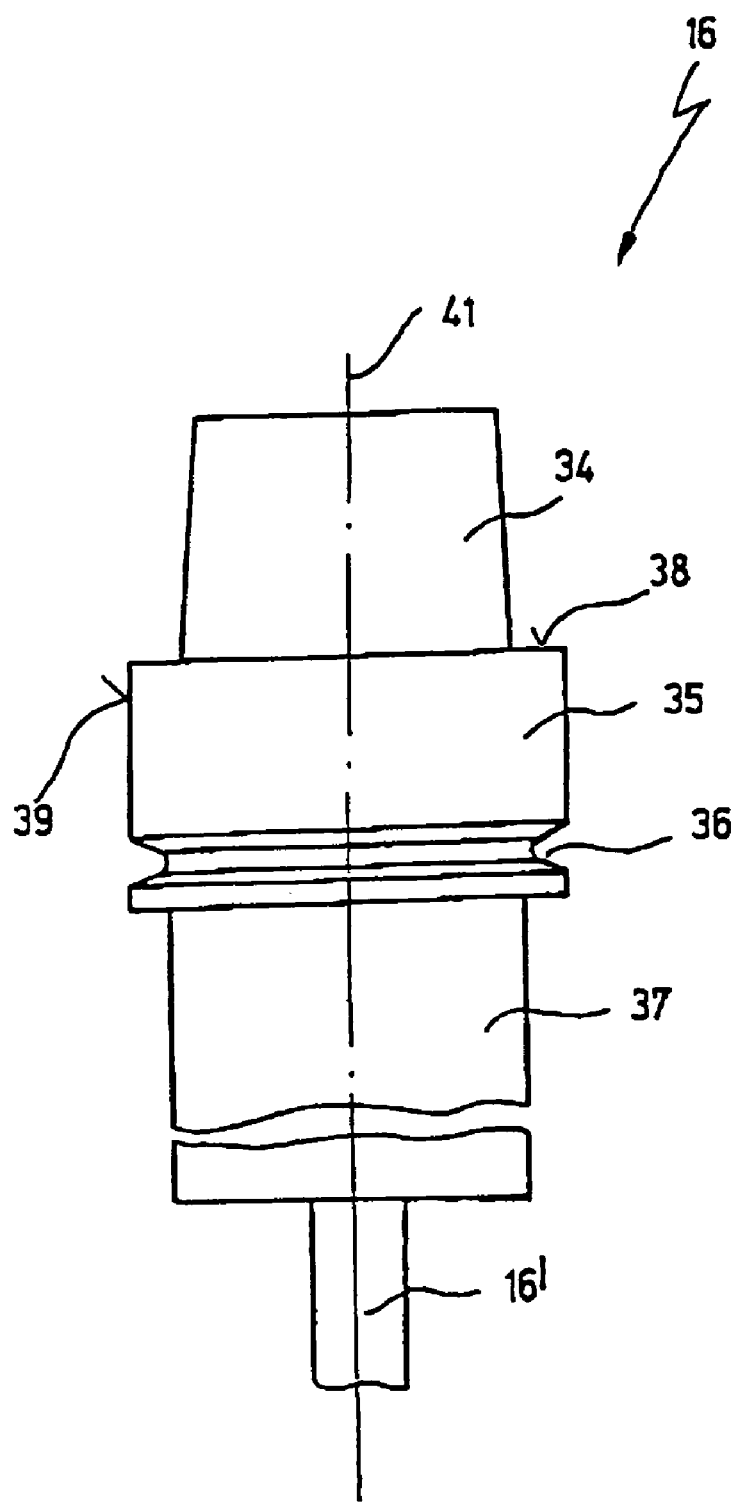
FIG. 2 shows, in a schematic side view, a hollow shank taper tool holder which can be inserted into the novel carrier.

FIG. 2 schematically shows a tool holder 16 as is used in the machine tool 10 from FIG. 1.

The tool holder 16 is a hollow shank taper tool holder with a hollow shank taper 34 which is matched in its outer contour to the tool-holding fixture 15.

The hollow shank taper 34 is adjoined at the bottom by a thickened collar 35 on the bottom of which is provided an encircling gripper groove 36 in which the carriers 24, 25 or 33 engage in a manner still to be described.

The thickened collar 35 is adjoined at the bottom by a shank 37 into which machining tools. 16' are clamped in a manner known per se.

The thickened collar 35 has an annular end face 38 which is to face the tapered hollow shank, and is surrounded by a cylindrical outer face 39 which runs symmetrically to a longitudinal axis (indicated at 41) of the tool holder 16.

When the tool holder 16 is clamped into the tool-holding fixture 15 by means of a clamping system (not illustrated in the figures) which is provided in the working spindles 12a, 12b, the end face 38 comes into contact with an end side (indicated at 42 in FIG. 1) of the working spindles 12a, 12b, as is generally known in the prior art.

Figure 3:
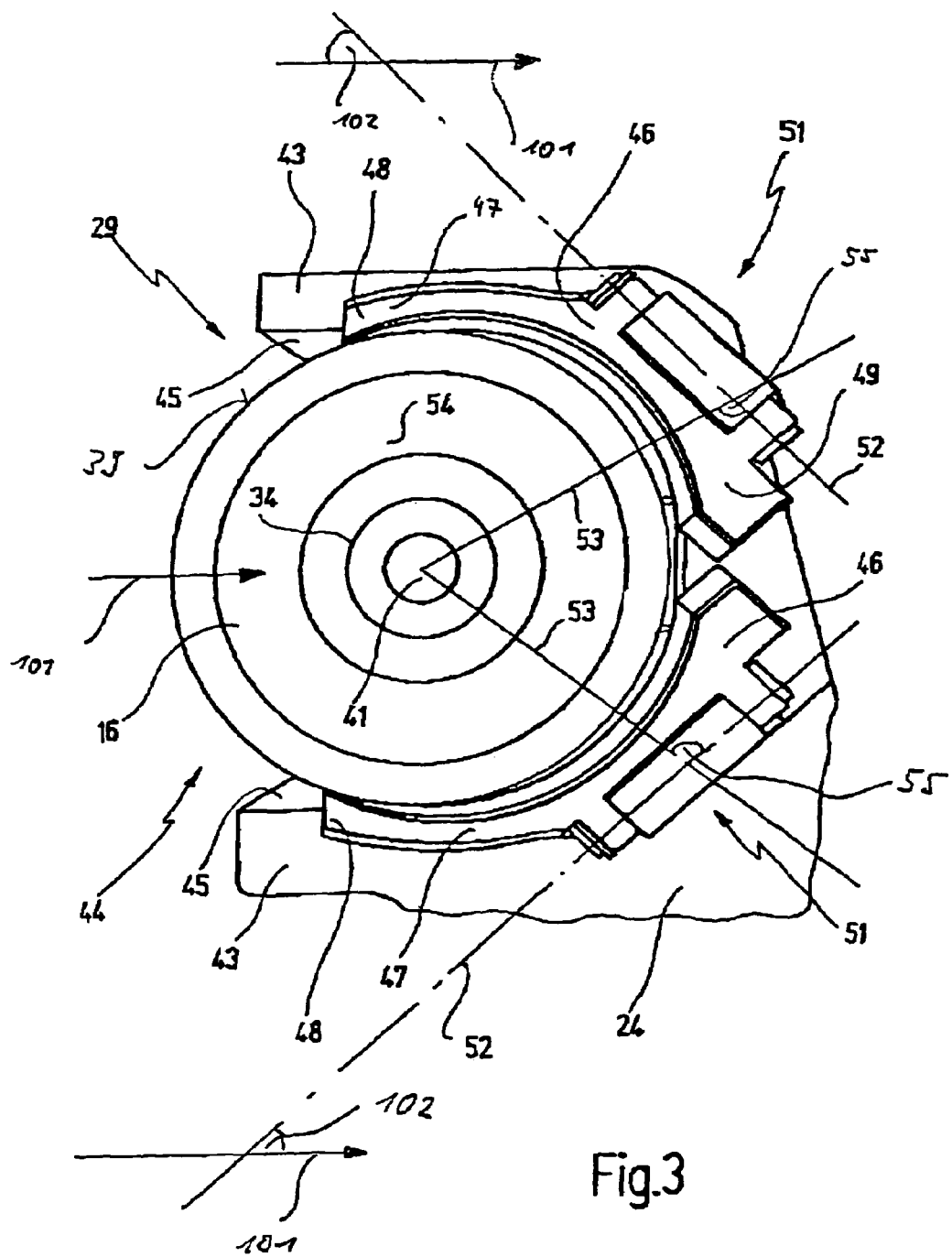
FIG. 3 shows a schematic plan view of the novel tool holder with the tool holder placed into it and locked.

FIG. 3 shows, in a schematic plan view, the carrier 24 from FIG. 1 in the region of the storage space 29 where the tool carrier 16 is clamped into place; the free storage space 28 is of comparable design, but is not illustrated. The carrier 24 comprises two fixed jaws 43 which define an opening 44 between them. The jaws 43 engage with their inner sides 45 in the gripper groove (known from FIG. 2) on the tool holder 16 and secure it in a form-fitting manner in the axial direction.

Also arranged on the carrier 24 are two movable jaws 46 which have a bent front end 47, the respective tip 48 of which is in contact with the outer face 39 (known from FIG. 2) of the tool holder 16.

At their rear end 49, the movable jaws 46 are mounted in each case movably on a joint 51, the pivot axis 52 of which runs in the plane of projection and therefore transversely with respect to the longitudinal axis 41 of the tool carrier 39.

Said two pivot axes 52 are running obliquely with respect to a direction (indicated at 101) along which said tool holder 16 is being inserted into said U-shaped fixed jaws 43. This direction 101 intersects said pivot axes 52 at an angle 102 that is well smaller than 90 degrees and in the embodiment shown is about 45 degrees. Thereby, said movable jaws 46 do not only pivot downwards out of the plane of the drawings said tips 48 thereby move radially outwardly away from said outer face 39.

Said movable jaws 46 release said tool holder 16 from said form-fit when said movable jaws 46 having been moved with the tips 48 onto the fixed jaws 43, i.e. said carrier 24.

A radial beam emanating from the longitudinal axis 41 is shown at 53 and, for example, at 54 describes an imaginary circle around the longitudinal axis 41. The radial beam 53 does not now intersect the longitudinal axes 52 at a right-angle, with the result that the pivot axes 52 are situated not only obliquely with respect to said direction 101 for inserting said tool holder, but in this case also obliquely with respect to the imaginary circle 54. The arrangement is made in such a manner that the radial beam 53 together with the particular pivot axis 52 form an angle 55 which is remote from the particular front end 47 and is greater than 90°.

This enables the tip 48 to move away from the outer face 39 when the movable jaws 46 are pivoted downwards out of the plane of the form-fitting connection that is shown in FIG. 3.

Figure 4:
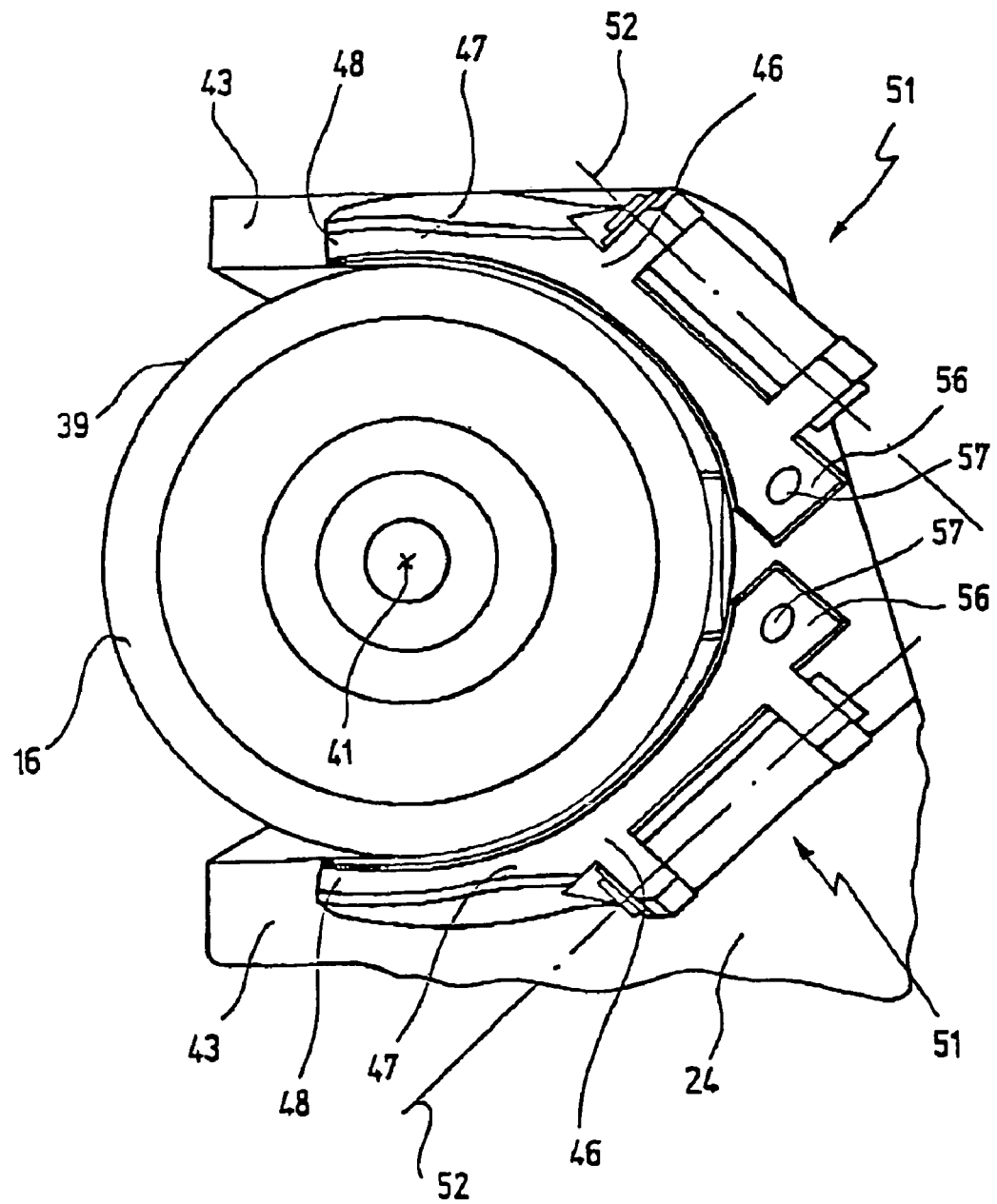
FIG. 4 shows an illustration as per FIG. 3, but with the tool holder released, i.e. with movable jaws in the expanded position.

Whereas the jaws 46 in FIG. 3 are shown in their closed position, FIG. 4 shows the jaws 46 in their expanded position, in which they have therefore been pivoted downwards out of the plane of the form-fitting connection.

It can be seen in FIG. 4 that the tips 48 come free from the outer face 39 to an extent such that the tool holder 16 can be pulled out to the left between the fixed jaws 43 in FIG. 4.

From the expanded position shown in FIG. 4, i.e. in which the jaws 46 have been pressed down onto the carrier 24, the jaws 46 are pressed again upwards into their closed position according to FIG. 3 by means of a compression spring 57 arranged below a lever 56. The compression spring 57 lies on the same side of the joint 51 as the front end 47. The compression spring 57 and the lever 56, which is formed integrally with the movable jaw 46, are used merely to prestress the movable jaws 46 into their closed position (shown in FIG. 3) and the retaining force, with which the tool holder 16 is retained in the carrier 24, is brought about merely by means of the form-fitting connection of the tips 48 with the cylindrical outer face 39. Should the tool holder 16 be pulled to the left in the closed position (shown in FIG. 3) of the jaws 46, this is prevented by the form-fitting connection as mentioned. In this case, a force component which would press the jaws 46 towards the carrier 24 is not exerted on the jaws 46, because the cylindrical outer face 39 runs centrically to the longitudinal axis 41.

The jaws 46 are otherwise pressed down onto the carrier 24 by the fact that the working spindle 12 moves with its end side 42 towards the carrier 24 from above, with the hollow shank taper 34 passing into the tool-holding fixture 15. In this case, the end side 42 presses at the same time from above onto the movable jaws 46, so that the tool holder 16 comes free from the carrier 24. The working spindle then moves with the tool holder 16 clamped in it out of the carrier 24 laterally in FIG. 4.

Figure 5:
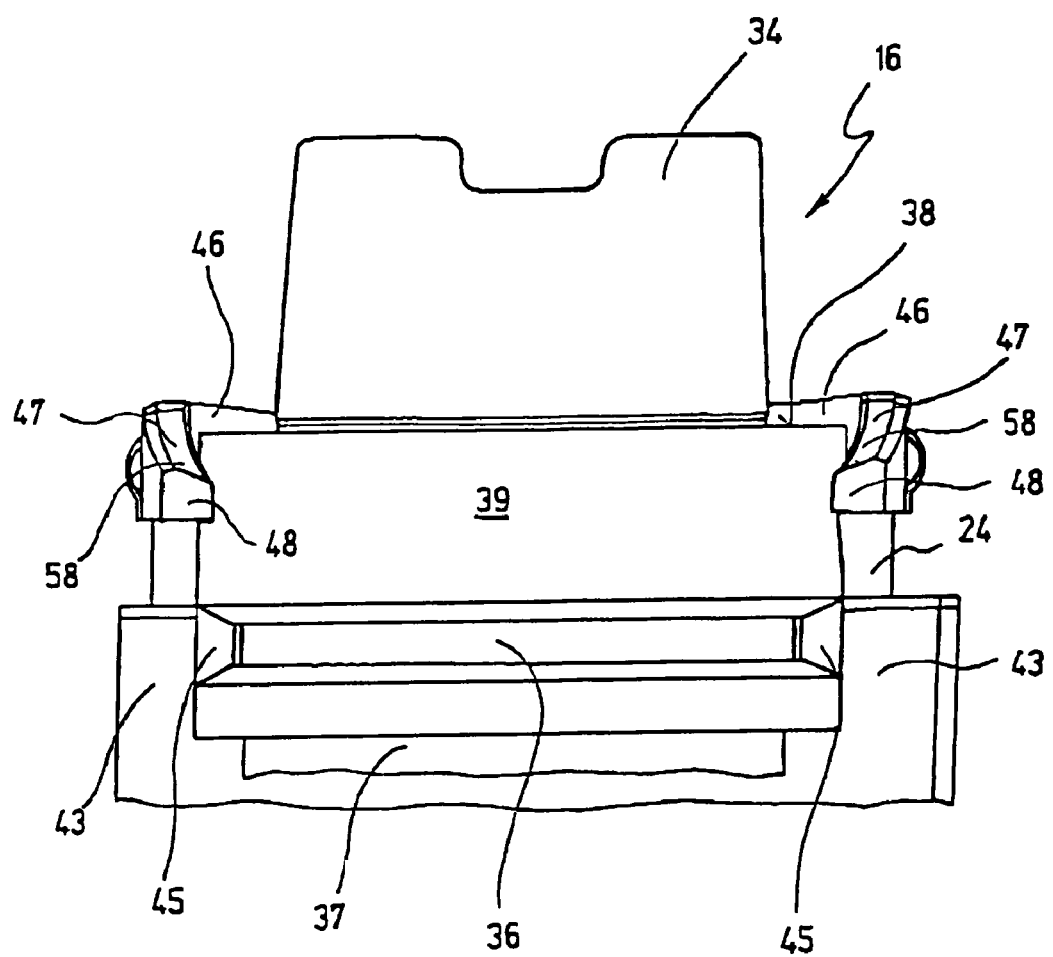
FIG. 5 shows a schematic front view of the carrier from FIG. 3.

FIG. 5 shows the carrier 24 in the closed position (shown in FIG. 3) of the movable jaws 46, in a view from the left. It can clearly be seen that the tips 48 of the front ends 47 engage around the outer face 39 of the tool holder 16 and therefore retain the latter in a form-fitting manner in the carrier 24.

It can furthermore be seen in FIG. 5 how the fixed jaws 43 engage with their inner sides 45 in the gripper groove 36. It can furthermore be seen that the front ends 47 have, upwards in the longitudinal direction, a face 58 which, facing out of the drawing of FIG. 5, runs in an inclined manner downwards towards the carrier.

If a working spindle 12 with tool holder 16 inserted now moves from the left in FIG. 3 towards a carrier 24 in such a manner that the fixed jaws 43 are inserted with their inner sides 45 into the gripper groove 36, the faces 58 pass under the end side 42 of the working spindles 12a, 12b and the tips 48 are pivoted downwards towards the carrier 42 when the working spindle 12 continues to push the tool holder 16 into the opening 44 between the fixed jaws 43.

Figure 6:
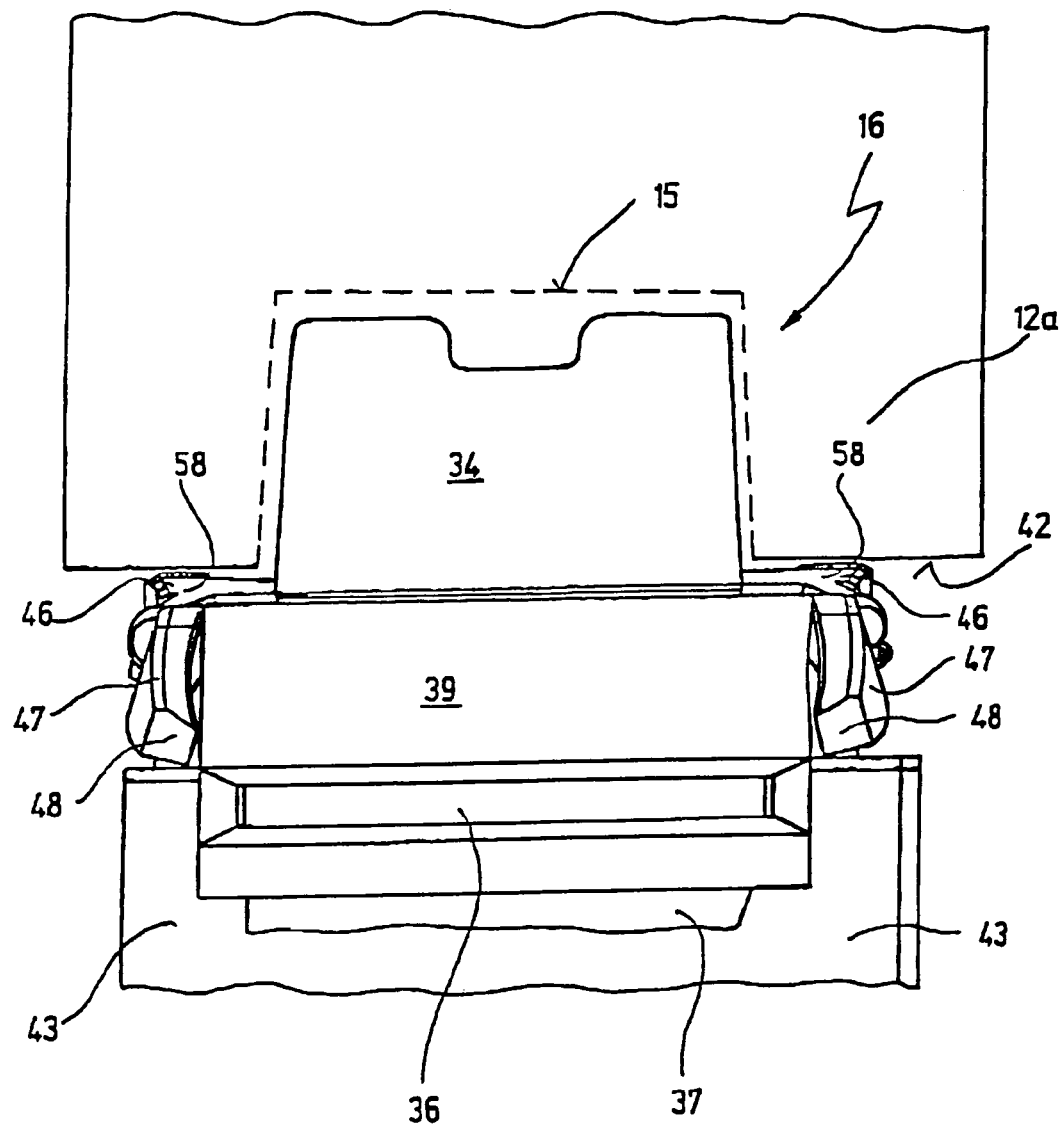
FIG. 6 shows a schematic front view of the carrier from FIG. 4.

This state is shown schematically in FIG. 6 which shows a view of the carrier 24 with jaws 46 in the expanded position, i.e. a plan view of the position according to FIG. 4, from the left there.

It can be seen in FIG. 6 that the working spindle 12a presses with its end side 42 onto the inclined surface 58 of the movable jaws 46, with the result that the front ends 47 thereof are pivoted downwards towards the carrier 24, so that the tips 48 are at a distance from each other which is sufficiently large in order to allow the tool holder 16 to pass. In other words, the form-fitting connection between the tips 48 and the outer face 39 is eliminated.

If, in FIG. 6, the working spindle 12a is now moved upwards, the movable jaws 46 pivot into their closed position shown in FIG. 5 so that the tool holder 16 is retained in a form-fitting manner.

Therefore, said tips 48 have a distance to said carrier 24 that is lower in said expanded position than in said closed position.

During this insertion of a tool holder 16, which is retained by a working spindle 12a, into the carrier 24, the working spindle 12a therefore comes with its end face 42 into contact with the face 58 of the movable jaws 46 because, when a tool carrier 16 is inserted into the carrier 24, this face 58 protrudes upwards over the end face 38 of the said tool carrier 16. This is also advantageous when removing a tool holder 16, that is retained in a carrier 24, by means of a working spindle 12a moving on from above, since even in the closed position shown in FIG. 5, the face 58 protrudes at least at its rear end over the outer tour of the tool holder 16, in particular over the end face thereof.

The invention claimed is:

1. Carrier for tool holders of a machine tool, said tool holders having a longitudinal axis, said carrier having arranged thereon at least one movable jaw with a tip, said at least one movable jaw being pivotably arranged on a pivot axis for pivoting said at least one movable jaw between an expanded position and a closed position,
   in said closed position, said at least one movable jaw grasping in a form-fitting manner one of said tool holders inserted into said carrier,
   whereby said pivot axis is arranged transversely with respect to said longitudinal axis, and wherein in said expanded position of said at least one movable jaw said tip has been pivoted away from an outer face of the tool holder,
   wherein in said closed position the at least one movable jaw rests with its tip on the outer face of the tool holder, which face runs essentially in the direction of the longitudinal axis,
   wherein said pivot axis runs obliquely with respect to a direction along which said tool holder is inserted into said carrier, and
   wherein the at least one movable jaw is prestressed in a spring-loaded manner into its closed position.

2. The carrier of claim 1, wherein the at least one movable jaw protrudes in the longitudinal direction above an outer contour of the tool holder, when said tool holder has been inserted into said carrier.

3. The carrier of claim 2, wherein two fixed jaws are provided which define an opening and by which a tool holder inserted laterally into the carrier through the opening is retained in a form-fitting manner in the longitudinal direction.

4. The carrier of claim 3, wherein the at least one movable jaw has a face which points upwards in the longitudinal direction and runs in an inclined manner downwards in the opposite longitudinal direction.

5. The carrier of claim 1, wherein the tip of said at least one movable jaw moves radially outwardly away from the outer face of the tool holder as the at least one movable jaw is pivoted from its closed position to its expanded position.

6. The carrier of claim 5, wherein the tip of said at least one movable jaw moves radially inwardly toward said the outer face of the tool holder as the at least one movable jaw is pivoted from its expanded position to its closed position.

7. Carrier for tool holders of a machine tool, said tool holders having a longitudinal axis, said carrier having arranged thereon at least one movable jaw with a tip, said at least one movable jaw being pivotably arranged on a pivot axis for pivoting said at least one movable jaw between an expanded position and a closed position, in said closed position, said at least one movable jaw grasping in a form-fitting manner one of said tool holders inserted into said carrier, whereby said pivot axis is arranged transversely with respect to said longitudinal axis, and wherein said pivot axis runs obliquely with respect to a direction along which said tool holder is inserted into said carrier, and wherein the at least one movable jaw is prestressed in a spring-loaded manner into its closed position.

8. The carrier of claim 7, wherein the at least one movable jaw protrudes in the longitudinal direction above an outer contour of the tool holder, when said tool holder has been inserted into said carrier.

9. The carrier of claim 8, wherein the at least one movable jaw has a face which points upwards in the longitudinal direction and runs in an inclined manner downwards in the opposite longitudinal direction.

10. The carrier of claim 7, wherein the tip of said at least one movable jaw moves radially outwardly away from the outer face of the tool holder as the at least one movable jaw is pivoted from its closed position to its expanded position.

11. The carrier of claim 10, wherein the tip of said at least one movable jaw moves radially inwardly toward said the outer face of the tool holder as the at least one movable jaw is pivoted from its expanded position to its closed position.

* * * * *